United States Patent
Hosotani et al.

(10) Patent No.: US 9,257,912 B2
(45) Date of Patent: Feb. 9, 2016

(54) SWITCHING POWER SUPPLY DEVICE

(71) Applicant: Murata Manufacturing Co., Ltd., Nagaokakyo-shi, Kyoto-fu (JP)

(72) Inventors: Tatsuya Hosotani, Nagaokakyo (JP); Naoki Yamaguchi, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 5 days.

(21) Appl. No.: 14/481,031

(22) Filed: Sep. 9, 2014

(65) Prior Publication Data
US 2014/0376274 A1 Dec. 25, 2014

Related U.S. Application Data

(63) Continuation of application No. PCT/JP2013/057371, filed on Mar. 15, 2013.

(30) Foreign Application Priority Data

Mar. 30, 2012 (JP) ................. 2012-080053

(51) Int. Cl.
*H02M 3/335* (2006.01)
*H01F 27/32* (2006.01)
*H01F 38/06* (2006.01)
*H02M 1/00* (2007.01)

(52) U.S. Cl.
CPC ......... *H02M 3/33546* (2013.01); *H01F 27/325* (2013.01); *H01F 38/06* (2013.01); *H02M 3/33569* (2013.01); *H02M 2001/0058* (2013.01); *Y02B 70/1491* (2013.01)

(58) Field of Classification Search
CPC ............ H02M 3/335; H02M 3/33507; H02M 3/33546; H02M 3/33569; H02M 3/33585; H02M 2001/0058; H01F 27/325; H01F 38/06
See application file for complete search history.

(56) References Cited

U.S. PATENT DOCUMENTS

| 7,768,801 | B2* | 8/2010 | Usui | H02M 3/33561 363/17 |
| 8,542,501 | B2* | 9/2013 | Kyono | H02M 3/285 363/21.02 |
| 2002/0080634 | A1 | 6/2002 | Nozawa et al. | |
| 2008/0219033 | A1 | 9/2008 | Nishikawa | |
| 2009/0147543 | A1 | 6/2009 | Sugawara et al. | |
| 2012/0063174 | A1* | 3/2012 | Kuwabara | H02M 1/4225 363/21.02 |

FOREIGN PATENT DOCUMENTS

| JP | 07-274498 A | 10/1995 |
| JP | 3201383 B2 | 8/2001 |
| JP | 2002-209381 A | 7/2002 |
| JP | 2008-228382 A | 9/2008 |
| JP | 2009-142088 A | 6/2009 |

OTHER PUBLICATIONS

Official Communication issued in International Patent Application No. PCT/JP2013/057371, mailed on May 14, 2013.

* cited by examiner

*Primary Examiner* — Matthew Nguyen
(74) *Attorney, Agent, or Firm* — Keating & Bennett, LLP

(57) ABSTRACT

In a switching power supply device, a partition portion that includes a slit divides a winding portion of a bobbin. A primary winding of a transformer is wound to a height h1 in a first section, and a secondary winding is wound to a height h2 in a second section. A low side drive winding and a high side drive winding are wound around the primary winding to a height h3 with the high side drive winding being located toward the secondary winding.

20 Claims, 14 Drawing Sheets

SWITCHING POWER SUPPLY DEVICE

BACKGROUND OF THE INVENTION

1. Field of the Invention

The present invention relates to switching power supply devices and, in particular, relates to a resonance type switching power supply device that utilizes a resonance phenomenon for an electric power conversion operation.

2. Description of the Related Art

A switching power supply device described in Japanese Unexamined Patent Application Publication No. 2008-228382 turns on/off a high side switching element and a low side switching element in an alternating manner so as to generate a resonance voltage in a primary winding of an insulated transformer, on the basis of a voltage generated in two auxiliary windings provided in the insulated transformer. As a result, the switching power supply device outputs a constant direct current voltage through a secondary winding of the insulated transformer. The switching power supply device described in Japanese Unexamined Patent Application Publication No. 2008-228382 is configured such that the primary winding is wound between the two auxiliary windings and the secondary winding. Through this, the degree of coupling between the two auxiliary windings and the primary winding is increased, and the degree of coupling between the two auxiliary windings and the secondary winding is reduced. This makes a voltage generated in the two auxiliary windings similar to a voltage generated in the primary winding, and a ZVS (zero voltage switching) operation is thus achieved.

In the switching power supply device described in Japanese Unexamined Patent Application Publication No. 2008-228382, it is desirable that the low side switching element operate with a waveform that is similar to the waveform of a voltage generated in an inductance of the primary winding and that the high side switching element operate with a waveform that is similar to the waveform of a voltage generated in an inductance of the secondary winding. Then, an operation such that the high side switching element and the low side switching element are turned on/off in an alternating manner is achieved more reliably. In other words, a low side drive winding needs to enhance its coupling with the primary winding, and the voltage waveforms of the low side drive winding and of the primary winding need to be made similar to each other. Meanwhile, a high side drive winding needs to enhance its coupling with the secondary winding, and the voltage waveforms of the high side drive winding and of the secondary winding need to be made similar to each other.

However, in the switching power supply device described in Japanese Unexamined Patent Application Publication No. 2008-228382, the primary winding is present between the drive windings (the high side drive winding and the low side drive winding) and the secondary winding, and thus the degree of coupling between the secondary winding and the auxiliary windings cannot be increased. In addition, in Japanese Unexamined Patent Application Publication No. 2008-228382, the physical distance between the primary winding and the secondary winding is small, and a leakage inductance generated through coupling between the primary winding and the secondary winding is reduced. Therefore, desired excitation inductance and leakage inductance cannot be generated. Furthermore, a distance in accordance with a safety standard needs to be provided between windings, which restricts design flexibility.

SUMMARY OF THE INVENTION

Accordingly, preferred embodiments of the present invention provide a switching power supply device in which an appropriate distance is secured between windings. In addition, preferred embodiments of the present invention provide a switching power supply device in which coupling between a low side drive winding and a primary winding and coupling between a high side drive winding and a secondary winding are enhanced and a ZVS operation of a high side switching element and a low side switching element are reliably achieved.

A switching power supply device according to a preferred embodiment of the present invention includes a power supply voltage inputting unit configured to accept input of an input power supply voltage, a direct current voltage outputting unit configured to output a direct current voltage, a transformer that includes a primary winding and a secondary winding that are wound around a winding portion of a bobbin, a low side drive winding, a high side drive winding, and a core defining a closed magnetic circuit, a capacitor that defines an LC resonant circuit including the primary winding, a series circuit that is connected to the power supply voltage inputting unit and that includes a low side switching element and a high side switching element, and a switching controlling circuit that includes a low side switching controlling unit configured or programmed to control the low side switching element and a high side switching controlling unit configured or programmed to control the high side switching element. The LC resonant circuit includes a leakage inductance of the primary winding or the secondary winding of the transformer. The low side switching element is connected to the primary winding in series and applies a voltage of the power supply voltage inputting unit to the primary winding upon being turned on. The low side switching controlling unit turns on the low side switching element upon detecting a reversal of a polarity of a winding voltage generated in the low side drive winding and turns off the low side switching element at a timing that is based on a feedback signal of a circuit that detects an output voltage. The high side switching controlling unit turns on the high side switching element upon detecting a reversal of a polarity of a winding voltage generated in the high side drive winding and turns off the high side switching element in accordance with an on time of the low side switching element. The bobbin includes a partition portion that includes a slit, and the partition portion is provided along the outer periphery of the winding portion and divides the winding portion into a first winding area in which the primary winding is wound and a second winding area in which the secondary winding is wound. The primary winding is wound to a first height h1 from the outer peripheral surface of the winding portion, and the secondary winding is wound to a second height h2 from the outer peripheral surface of the winding portion. The low side drive winding and the high side drive winding are wound on the primary winding so as to be next to each other in a winding axis direction with the high side drive winding located toward the secondary winding.

According to this configuration, the low side drive winding and the high side drive winding are wound on the outer side portion of the primary winding, and thus coupling between the low side drive winding and the high side drive winding with the primary winding is strong. Through this, the waveform of a voltage generated in the low side drive winding becomes similar to the waveform of a voltage generated in the primary winding. Thus, the low side switching controlling unit is configured or programmed to properly detect the timing of resonance by detecting the polarity reversal of the voltage generated in the low side drive winding so as to turn on the low side switching element and to reliably carry out a ZVS operation of the low side switching element. In addition, since the timing of the resonance is detected properly, a state that deviates from a resonance condition ("off-resonance") is reliably prevented, and the reliability of the device is thus improved.

In addition, the high side drive winding and the secondary winding are wound about the same or substantially the same winding axis and are wound at least partially to the same height in a range from the height h1 to the height h2, and thus coupling between the high side drive winding and the secondary winding is strong. Thus, the waveform of a voltage generated in the high side drive winding becomes similar to the waveform of a voltage generated in the secondary winding, and the high side switching controlling unit is configured or programmed to turn on the high side switching element at a timing at which a voltage is generated in the secondary winding so as to carry out the ZVS operation of the high side switching element.

It is preferable that the switching power supply device includes a cover that includes a protruding portion to be fitted into the slit in the bobbin and that covers the primary winding, the secondary winding, the low side drive winding, and the high side drive winding.

According to this configuration, as the protruding portion is fitted into the slit in the bobbin, the spatial distance between the primary winding and the secondary winding is increased so as to be equal or substantially equal to the creeping distance, and thus the primary winding and the secondary winding are brought close to each other so as to enhance the coupling therebetween while ensuring a distance in accordance with a safety standard.

The height of the partition portion at a side that opposes a board on which the transformer is mounted preferably is greater than the second height h2.

At an upper portion of the bobbin (side that does not oppose the board), as the protruding portion of the cover that covers the windings is fitted into the slit in the bobbin, the spatial distance is increased so as to be equal or substantially equal to the creeping distance to thus secure a distance in accordance with the safety standard. At a lower portion of the bobbin (side that opposes the board), in the meantime, the protruding portion of the cover cannot be fitted into the slit in the bobbin. According to the above configuration, by setting the height of the partition portion at a side that opposes the board on which the transformer is mounted to be greater than the second height h2, the spatial insulating distance between the primary winding and the secondary winding is secured without increasing the overall size of the transformer.

The partition portion may be provided at a position that is offset from the middle of the winding portion along the winding axis.

According to this configuration, by setting the gap position of the core of the transformer at or substantially at a middle of the winding portion, a leakage magnetic flux through the gap is absorbed (blocked) by the winding, and thus an influence of the magnetic flux on the peripheral circuits is prevented.

The secondary winding may have a center tap removed therefrom and may include a first winding and a second winding that are wound as a bifilar winding.

According to this configuration, by making the coupling between the primary winding and each of the first winding and the second winding of the secondary winding equal or substantially equal, coupling between the primary winding with the first winding and the second winding of the secondary winding is made uniform or substantially uniform, and thus an imbalanced operation at the time of center tap rectification is reliably prevented.

A cross-section of the core along a direction perpendicular or substantially perpendicular to the winding axis preferably has a flat shape that is shortest in a direction corresponding to the height dimension when the transformer is mounted.

In this case, the height of the transformer is significantly reduced.

The capacitor preferably is connected between the high side switching element and the low side switching element.

In this case, by connecting a current detecting capacitor in parallel to a resonant capacitor and by branching a current flowing in the resonant capacitor slightly into the current detecting capacitor, a resonant current flowing in the resonant capacitor is detected equivalently, and an overcurrent protection circuit is provided by limiting the aforementioned current. Thus, a loss through detection resistance is significantly reduced.

According to various preferred embodiments of the present invention, a switching power supply device in which an appropriate distance is secured between windings is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiment 1

Figure 1:
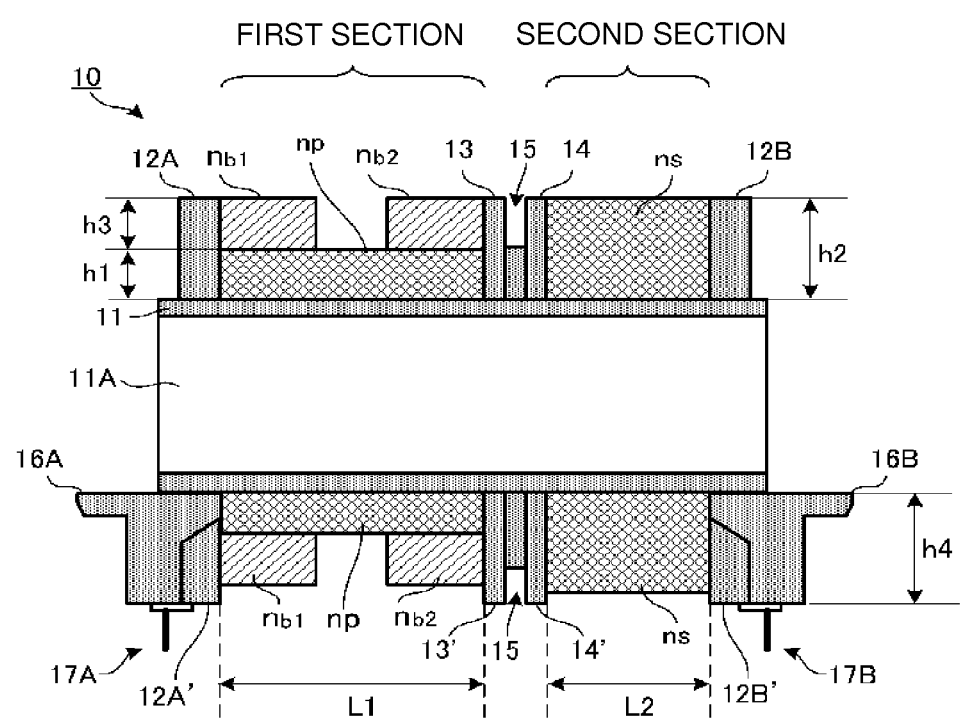
FIG. 1 is a sectional view of a bobbin in a transformer according to Preferred Embodiment 1 of the present invention.
Figure 2:
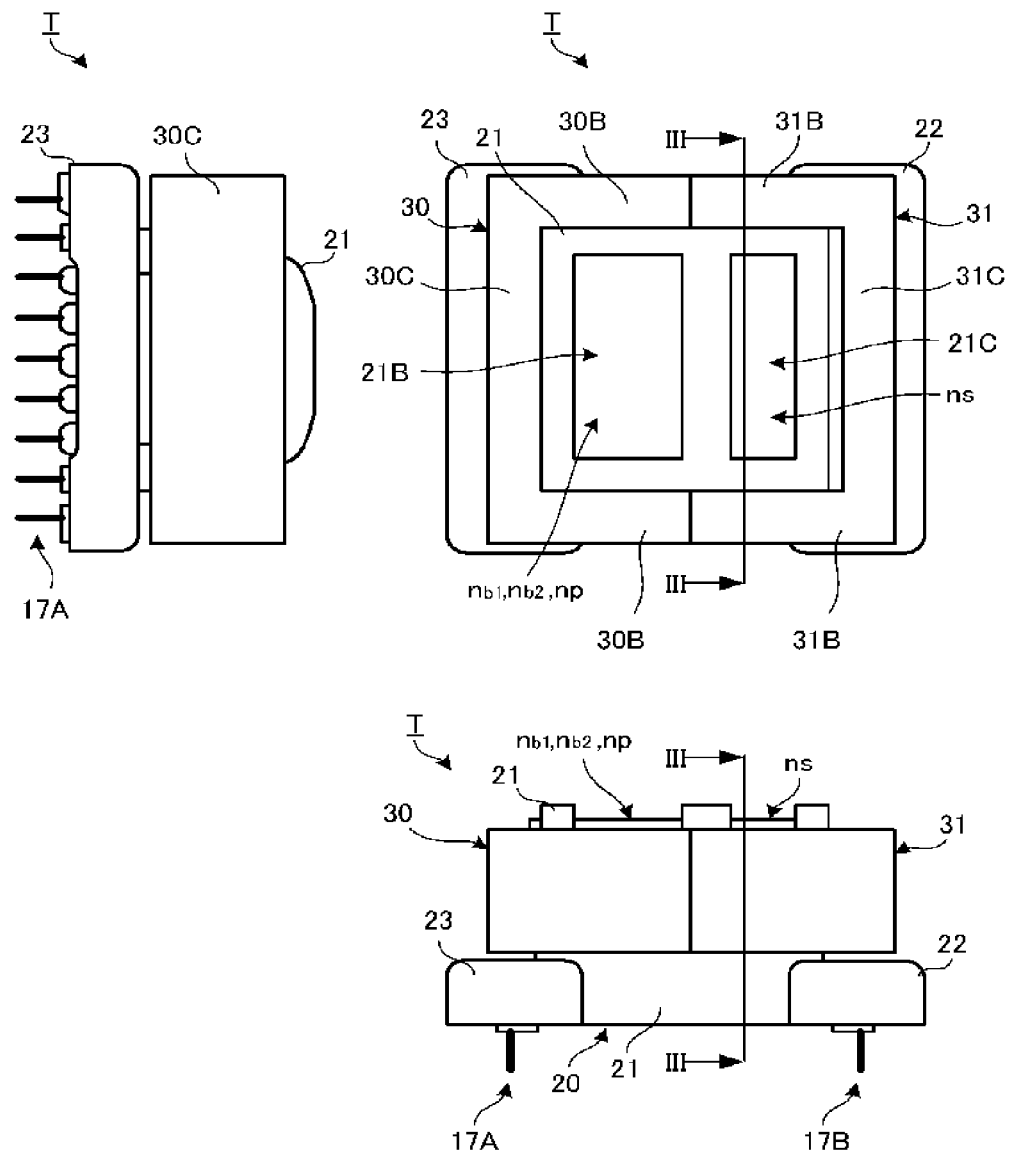
FIG. 2 illustrates three orthographic views of the transformer according to Preferred Embodiment 1 of the present invention.
Figure 3:
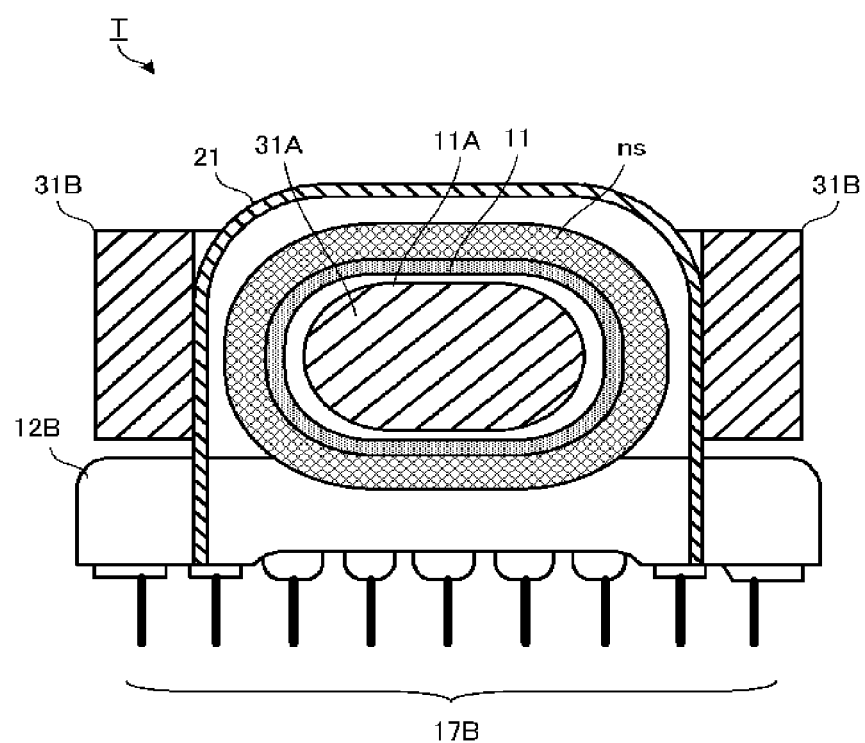
FIG. 3 is a sectional view of FIG. 2 taken along III-III line.
Figure 4:
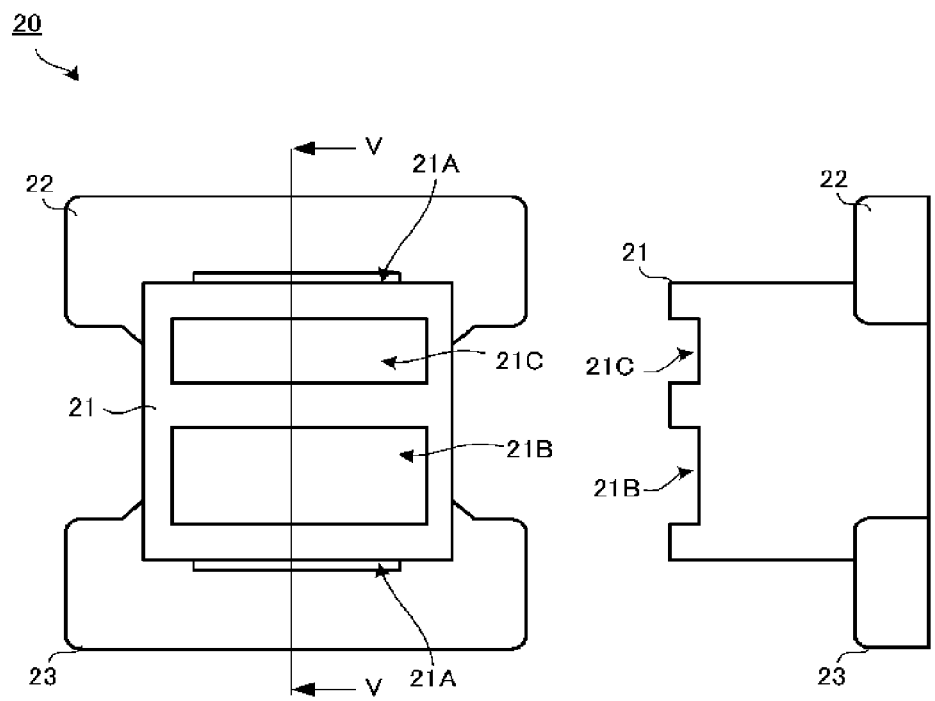
FIG. 4 illustrates three orthographic views of a cover of the transformer.
Figure 4:
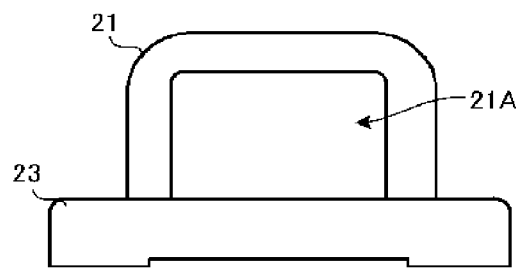
Figure 5:
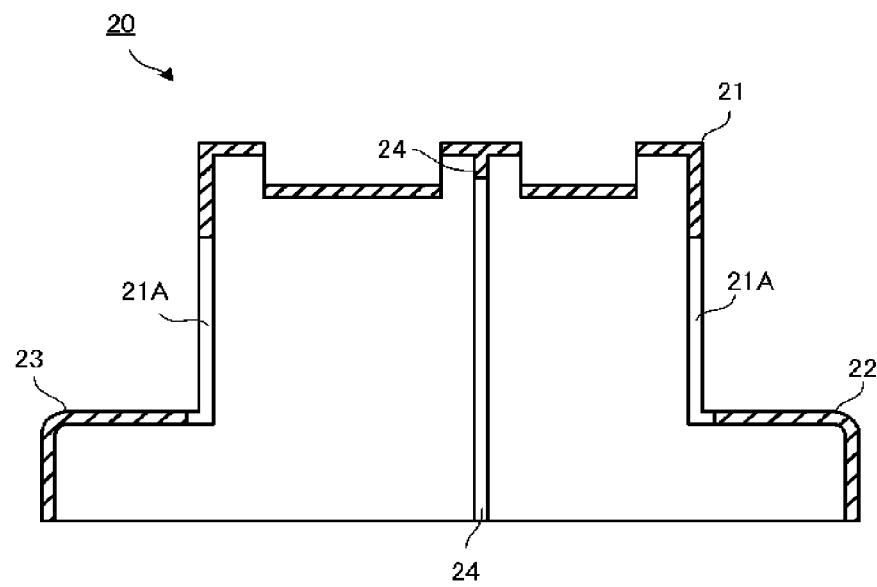
FIG. 5 is a sectional view of FIG. 4 taken along V-V line.
Figure 6:
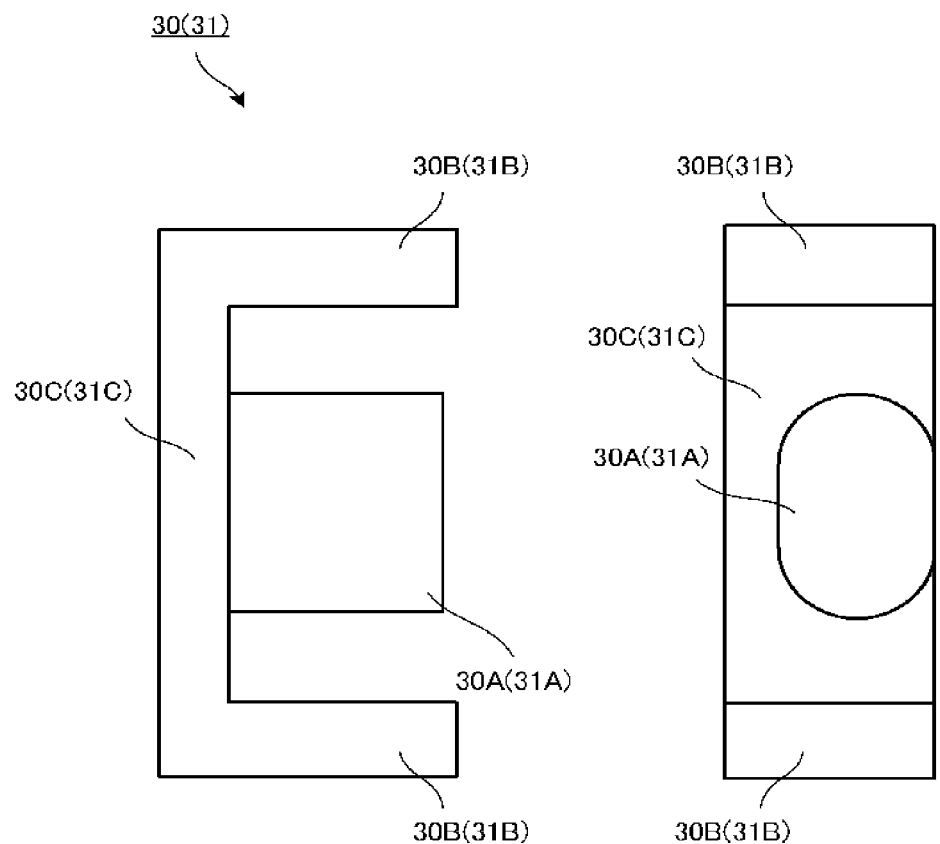
FIG. 6 illustrates a top view and a right side view of a magnetic core of the transformer.

FIG. 1 is a sectional view of a bobbin in a transformer according to Preferred Embodiment 1 of the present invention. FIG. 2 illustrates three orthographic views of the transformer according to Preferred Embodiment 1. FIG. 3 is a sectional view of FIG. 2 taken along III-III line. FIG. 4 illustrates three orthographic views of a cover of the transformer. FIG. 5 is a sectional view of FIG. 4 taken along V-V line. FIG. 6 illustrates a top view and a right side view of a magnetic core of the transformer.

A transformer T according to Preferred Embodiment 1 includes a bobbin 10, a cover 20, and magnetic cores 30 and 31. A primary winding np, a secondary winding ns, and drive windings nb1 and nb2 are wound around the bobbin 10. The cover 20 is placed on the bobbin 10 around which the primary winding np is wound. The magnetic cores 30 and 31, which preferably are so-called E type cores, are fitted into the bobbin 10 on which the cover 20 is placed, and define a closed magnetic circuit for a magnetic field of the primary winding np and the secondary winding ns.

As illustrated in FIG. 1, the bobbin 10 includes a cylindrical portion (a winding portion of preferred embodiments of the present invention) 11 preferably made of an insulating resin. The cylindrical portion 11 extends in an axial direction (horizontal direction on the paper plane of FIG. 1) and defines an interior space 11A that opens at two ends. Center legs 30A and 31A (see FIG. 6) of the respective magnetic cores 30 and 31, which will be described later, are inserted into the interior space 11A through the openings provided at the two ends. The leading ends of the center legs 30A and 31A oppose each other with an air gap provided therebetween at or approximately at the middle of the cylindrical portion 11 in the axial direction. In addition, terminal blocks 16A and 16B are provided on the cylindrical portion 11 at respective ends in the axial direction. Bobbin terminals 17A and 17B, in each of which a plurality of pins are arrayed at a predetermined pitch, are provided on the respective terminal blocks 16A and 16B at lower sides thereof (lower side on the paper plane of FIG. 1). The transformer T is mounted on a mount board as the bobbin terminals 17A and 17B are soldered onto the mount board.

End plates 12A and 12B are provided on the peripheral surface of the cylindrical portion 11 at two end portions thereof so as to be perpendicular or substantially perpendicular to the peripheral surface. In addition, partition plates (partition portions of preferred embodiments of the present invention) 13 and 14 are provided on the peripheral surface of the cylindrical portion 11 at positions that are offset from the middle or substantially the middle thereof in the axial direction so as to be perpendicular or substantially perpendicular to the peripheral surface. Specifically, when the distance between the partition plate 13 and the end plate 12A is represented by L1 and the distance between the partition plate 14 and the end plate 12B is represented by L2, the relationship of L1>L2 holds true. Furthermore, a slit 15 is located between the partition plates 13 and 14. The slit 15 is provided in order to secure a distance between the primary winding np and the secondary winding ns wound around the cylindrical portion 11 in accordance with the safety standard. In the description to follow, a portion between the end plate 12A and the partition plate 13 is referred to as a first section (first winding area of preferred embodiments of the present invention), and a portion between the end plate 12B and the partition plate 14 is referred to as a second section (second winding area of preferred embodiments of the present invention).

The end plates 12A and 12B and the partition plates 13 and 14, which define the first section and the second section, are provided along the circumferential direction of the cylindrical portion 11 and differ in height depending on the position in the circumferential direction. Here, a side of the transformer T that faces the board when the transformer T is mounted on the board, or in other words, a side at which the bobbin terminals 17A and 17B are provided is defined as a lower side of the transformer T. In this case, the height h4 of the end plates 12A' and 12B' and the partition plates 13' and 14' at the lower side of the transformer T is greater than the height (height h2 in the present preferred embodiment) of the end plates 12A and 12B and the partition plates 13 and 14 at the upper side of the transformer T.

In the first section, the primary winding np is wound around the cylindrical portion 11 with the axial direction of the cylindrical portion 11 serving as a winding axis. The primary winding np is wound to a height h1 from the peripheral surface of the cylindrical portion 11. In the second section, the secondary winding ns is wound around the cylindrical portion with the axial direction of the cylindrical portion 11 serving as a winding axis. The secondary winding ns is wound to the height h2 (>h1) from the peripheral surface of the cylindrical portion 11. The secondary winding ns preferably includes a center tap, and two windings divided by the center tap are wound as a bifilar winding. While details will be described later, the partition plates 13 and 14 and the slit 15 are provided between the primary winding np and the secondary winding ns. Thus, a creeping distance between the primary winding np and the secondary widing ns is reliably secured without increasing the straight-line distance between the primary winding np and the secondary winding ns. Through this, the distance in accordance with the safety standard is secured without weakening the magnetic field coupling between the primary winding np and the secondary winding ns.

In addition, the gap between the magnetic cores 30 and is located at or substantially at the middle of the cylindrical portion 11 in the axial direction. Thus, on the basis of the relationship of L1>L2, the gap is located within a winding range of the primary winding np. Through this, a leakage magnetic flux generated through the gap between the magnetic cores 30 and 31 defining the closed magnetic circuit is absorbed (blocked) by the primary winding np, and the influence on the peripheral circuits is significantly reduced.

The drive windings nb1 and nb2 are wound around the primary winding np that is wound in the first section. The drive windings nb1 and nb2 are wound such that the drive winding nb2 is located to the side of the secondary winding ns and that a predetermined space is provided between the drive windings nb1 and nb2 in the axial direction of the cylindrical portion 11. The drive windings nb1 and nb2 are wound to a height h3 from the primary winding np. Here, the relationship of h3=h2−h1 is satisfied. Thus, the outermost peripheries of the drive windings nb1 and nb2 are level with the outermost periphery of the secondary winding ns. The drive windings nb1 and nb2 are wound in the first section, and their coupling with the primary winding np is thus strong. In addition, the drive winding nb2 is proximate to the secondary winding ns in the axial direction and has the same or substantially the same height as the secondary winding ns, and thus the cross-sectional area of the coil of the drive winding nb2 is the same or substantially the same as the cross-sectional area of the coil of the secondary winding. Thus, the waveform of a voltage induced in the drive winding nb2 becomes similar or substantially similar to the waveform of a voltage generated in the secondary winding ns.

Here, even in a case in which the drive winding nb2 is wound to a height that exceeds the height h3, the drive winding nb2 and the secondary winding ns are wound to the same height within a range from the height h1 to the height h2, and thus the waveform of a voltage induced in the drive winding nb2 becomes similar or substantially similar to the waveform of a voltage generated in the secondary winding ns. In addition, even in a case in which the drive winding nb2 is wound to a height that is less than the height h3, the drive winding nb2 is wound within a height range of the secondary winding ns, and thus the waveform of a voltage induced in the drive winding nb2 becomes similar or substantially similar to the waveform of a voltage generated in the secondary winding ns.

As described above, the height of the end plates 12A' and 12B' and the partition plates 13' and 14' at the lower side of the transformer T is greater than the height of the end plates 12A and 12B and the partition plates 13 and 14 at the upper side of the transformer T. In the present preferred embodiment, the height of the end plates 12A and 12B and the partition plates 13 and 14 at the upper side of the transformer T corresponds to the height h2 of the secondary winding ns. Thus, while reducing the height of the transformer T, a spatial insulating distance from the primary winding np, the secondary winding ns, and the drive windings nb1 and nb2 to the board on which the transformer T is mounted are secured.

In addition, a cross-section of the cylindrical portion 11 along a direction perpendicular or substantially perpendicular to the axial direction has a flat shape that is shorter in the vertical direction (height-dimension direction when the transformer T is mounted in the present invention) of the transformer T. Through this, the height of the transformer T is reduced.

The cover 20 is preferably made of an insulating resin and covers the bobbin 10 configured as described above. As illustrated in FIG. 4, the cover 20 includes a center cover 21 that covers the first section and the second section of the bobbin 10. The center cover 21 includes side surface portions and a top surface portion and surrounds the first section and the second section of the bobbin 10 in three directions. The center cover 21 includes openings 21A, 21A, and the openings 21A, 21A overlap the openings of the interior space 11A in the cylindrical portion 11 when the cover 20 is placed on the bobbin 10. The center legs 30A and 31A of the respective magnetic cores 30 and 31 are inserted into the interior space 11A of the cylindrical portion 11 through the openings 21A, 21A.

In the top surface portion of the center cover 21, an opening 21B is provided at a position that is to oppose the first section of the bobbin 10, and an opening 21C is provided at a position that is to oppose the second section of the bobbin 10. Two end portions 22 and 23 configured to cover the terminal blocks 16A and 16B, respectively, are provided at respective end portions of the center cover 21 in the axial direction.

Figure 7:
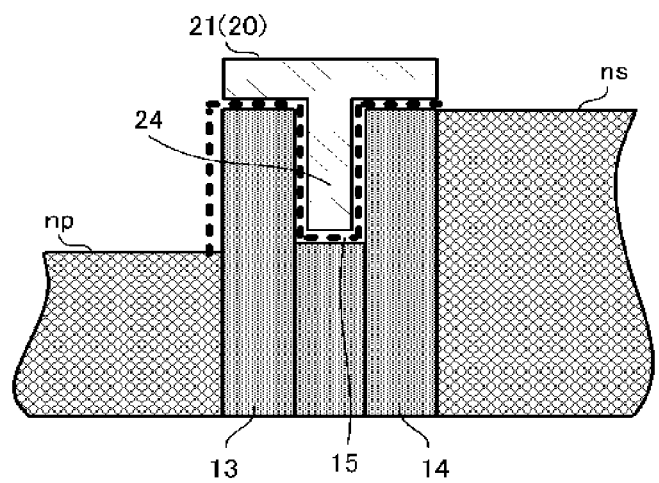
FIG. 7 is an enlarged sectional view of a portion around a slit and a protruding portion in a state in which the cover is placed on the bobbin.

In addition, as illustrated in FIG. 5, a protruding portion 24 is provided on the inner side portions of the top surface portion and the side surface portion of the cover 20, and the protruding portion 24 fits into the slit 15 in the bobbin 10 when the cover 20 is placed on the bobbin 10. FIG. 7 is an enlarged sectional view of a portion around the slit 15 and the protruding portion 24 in a state in which the cover 20 is placed on the bobbin 10. In FIG. 7, the drive winding nb1 is omitted.

A predetermined distance preferably is provided between the primary winding np and the secondary winding ns in accordance with the safety standard. However, if the primary winding np and the secondary winding ns are simply spaced apart from each other, the magnetic field coupling is weakened. Therefore, by providing the slit 15 in the bobbin 10, the creeping distance between the primary winding np and the secondary winding ns turns out as indicated by the broken line in FIG. 7, and the distance in accordance with the depth of the slit 15 is obtained. In addition, as the protruding portion 24 of the cover 20 is fitted into the slit 15, the space between the primary winding np and the secondary winding ns corresponds to the space between the slit 15 and the protruding portion 24. Thus, the spatial distance between the primary winding np and the secondary winding ns becomes equal to the creeping distance. In this manner, by providing the slit 15 and the protruding portion 24 of the cover 20, the creeping distance and the spatial distance between the primary winding np and the secondary winding ns are secured at a sufficient level without weakening the magnetic field coupling.

Subsequently, the magnetic cores 30 and 31 will be described. The magnetic cores 30 and 31 preferably have an identical shape, and thus the magnetic core 30 will be described hereinafter with the reference characters corresponding to the magnetic core 31 being placed in the parentheses. The magnetic core 30 (31) preferably is an E type core having the center leg 30A (31A), two end legs 30B, 30B (31B, 31B), and a connecting portion 30C (31C). The center leg 30A (31A) and the two end legs 30B, 30B (31B, 31B) are parallel or substantially parallel to one another and are provided on the connecting portion 30C (31C) such that the center leg 30A (31A) is located between the two end legs 30B, 30B (31B, 31B). In addition, the center leg 30A (31A) has a flat cross-section as in the interior space 11A of the cylindrical portion 11 (see FIG. 4). The center legs 30A and 31A are inserted into the interior space 11A of the cylindrical portion 11 through the openings 21A, 21A provided in the cover 20. The leading end portions of the center leg 30A and the center leg 31A oppose each other with a gap provided therebetween, and the leading end portions of the two end legs 30B, 30B and the two end legs 31B, 31B abut against each other. Through this, the magnetic cores 30 and 31 define a closed magnetic circuit including an air gap.

Hereinafter, a switching power supply according to Preferred Embodiment 1 provided with the transformer T configured as described above will be described.

Figure 8:
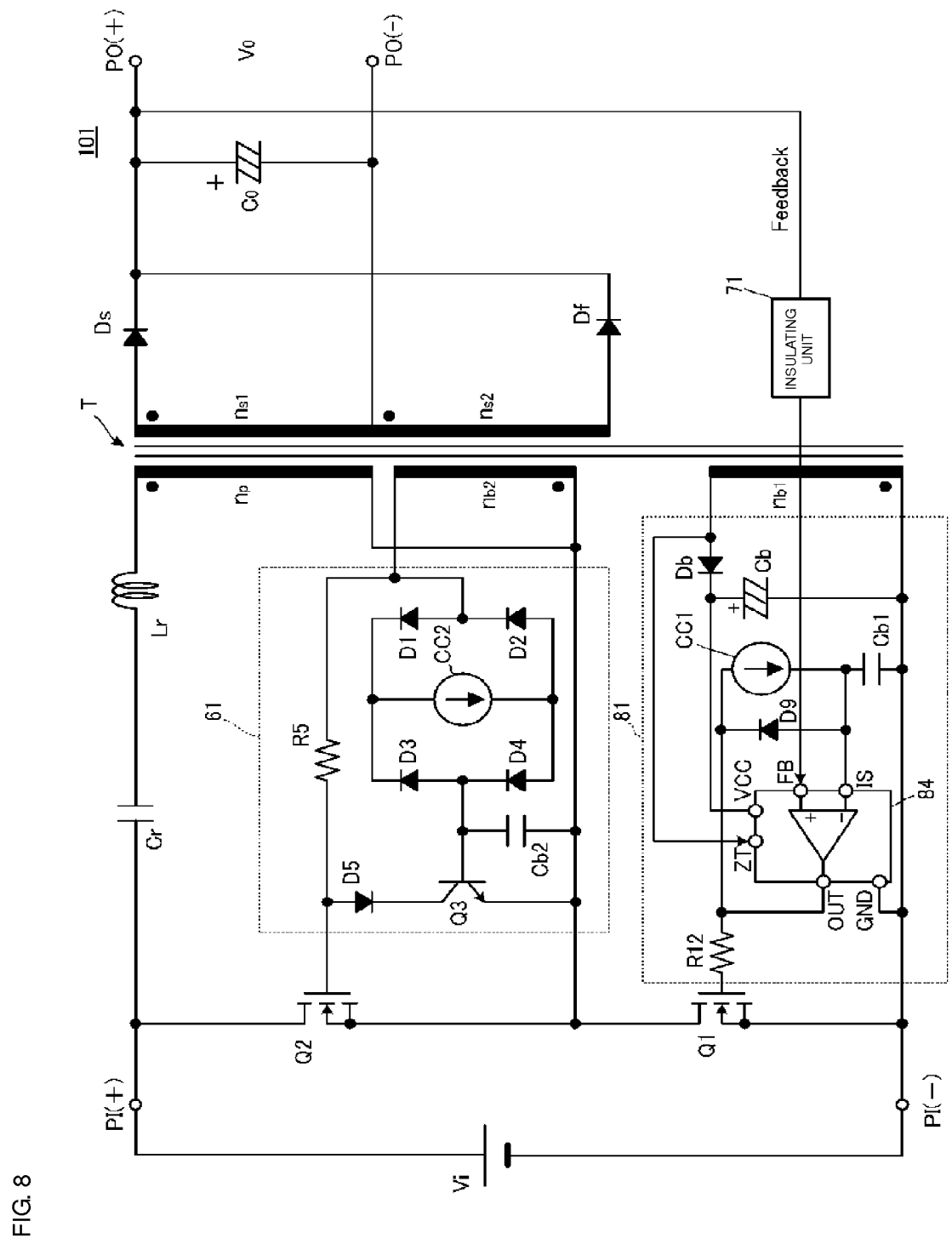
FIG. 8 is a circuit diagram of a switching power supply device 101 according to Preferred Embodiment 1 of the present invention.

FIG. 8 is a circuit diagram of a switching power supply device according to Preferred Embodiment 1. A voltage of an input power supply Vi is inputted between input terminals PI(+) and PI(−) of a switching power supply device 101. A predetermined direct current voltage Vo is then outputted to a load (not illustrated) that is connected between output terminals PO(+) and PO(−) of the switching power supply device 101.

A first series circuit (LC resonant circuit of the present invention) in which a resonant capacitor Cr, a resonant inductor Lr, the primary winding np of the transformer T, and a low side switching element Q1 are connected in series is provided between the input terminals PI(+) and PI(−). The resonant inductor Lr is a leakage inductance of the transformer T. Here, the resonant inductor Lr may be an inductor connected to the primary winding np of the transformer T, in place of the leakage inductance of the transformer T. The low side switching element Q1 is preferably provided by an n-type MOS-FET, and a drain terminal of the low side switching element Q1 is connected to the primary winding np of the transformer T.

A second series circuit in which a high side switching element Q2, the resonant capacitor Cr, and the resonant inductor Lr are connected in series is provided between respective ends of the primary winding np of the transformer T.

The secondary winding ns of the transformer T includes a center tap and is provided by connecting secondary windings ns1 and ns2 in series. The secondary windings ns1 and ns2 are wound as a bifilar winding so as to define the secondary winding ns as illustrated in FIG. 1. A rectifying smoothing circuit that includes diodes Ds and Df and a capacitor Co is provided on the secondary windings ns1 and ns2. This rectifying smoothing circuit rectifies and smoothes the full waves of an alternating current voltage outputted from the secondary windings ns1 and ns2 and then outputs the resulting voltage to the output terminals PO(+) and PO(−).

A low side switching controlling unit (switching controlling circuit of preferred embodiments of the present invention) 81 is connected to the drive winding (hereinafter, referred to as a low side drive winding) nb1 of the transformer T. This low side switching controlling unit 81 includes a rectifying smoothing circuit including a diode Db and a capacitor Cb. A direct current voltage obtained through this rectifying smoothing circuit is supplied to a VCC terminal of a switching controlling IC 84 as a power supply voltage. The switching controlling IC 84 preferably is a general purpose switching controlling IC that operates in a current mode.

A feedback circuit is provided between the output terminals PO(+) and PO(−) and the switching controlling IC 84. In FIG. 8, only a feedback path is indicated simply by a single line (Feedback). An insulating unit 71 is provided on the feedback path, and a photocoupler, a pulse transformer, or the like can, for example, be used as the insulating unit 71. Specifically, a feedback signal is generated by comparing a divided voltage value of the direct current voltage Vo across the output terminals PO(+) and PO(−) with a reference voltage, and a feedback voltage is inputted to an FB terminal of the switching controlling IC 84 in an insulated state. This feedback voltage that is inputted to the FB terminal becomes higher as the direct current voltage Vo is lower.

In addition, the switching controlling IC 84 includes an OUT terminal and a ZT terminal. The OUT terminal of the switching controlling IC 84 is connected to a gate terminal of the low side switching element Q1 through a resistor R12. A voltage generated at the low side drive winding nb1 is inputted to the ZT terminal of the switching controlling IC 84. The switching controlling IC 84 includes a voltage polarity reversal detecting circuit configured to detect that an input voltage of the ZT terminal has been reversed, and a turn-off delaying circuit. The voltage polarity reversal detecting circuit includes a comparator configured to compare a reference voltage generated thereinside with a voltage at the ZT terminal. When an output voltage of this comparator becomes a low level, the OUT terminal is turned to a low level after a delay time td1 set by the turn-off delaying circuit elapses. Through this, the low side switching element Q1 is turned off. Meanwhile, when the output of the comparator becomes a high level, the OUT terminal is reversed to a high level after a delay time td0 elapses, which will be described later. Through this, the low side switching element Q1 is turned on.

The low side drive winding nb1 is wound around the primary winding np about the same winding axis, and thus coupling between the low side drive winding nb1 and the primary winding np is strong. Therefore, the waveform of a voltage generated in the low side drive winding nb1 becomes similar to the waveform of a voltage generated in the primary winding np. In other words, the waveform of a voltage generated in the low side drive winding nb1 becomes similar to a waveform obtained by combining the waveform of a voltage generated in the excitation inductance of the primary winding np and the waveform of a voltage generated in the resonant inductor Lr. Therefore, the switching controlling IC 84 detects the timing of resonance properly by detecting the polarity reversal of a voltage generated in the low side drive winding nb1 and turns on the low side switching element Q1. Thus, the switching controlling IC 84 reliably performs the ZVS operation of the low side switching element Q1. In addition, by properly detecting the timing of resonance, the switching controlling IC 84 properly detects the resonance state and reliably prevents "off-resonance."

In addition, a series circuit provided by a constant current circuit CC1 and a capacitor Cb1 is connected to the OUT terminal of the switching controlling IC 84 such that a charging voltage of the capacitor Cb1 is inputted to an IS terminal. The constant current circuit CC1 charges the capacitor Cb1 with a constant current through a voltage at the OUT terminal of the switching controlling IC 84. The comparator in the switching controlling IC 84 compares a voltage at the capacitor Cb1 with a voltage at the FB terminal, and when a voltage at the IS terminal exceeds a voltage at the FB terminal, the switching controlling IC 84 changes the voltage at the OUT terminal from a high level to a low level. Thus, as the voltage at the FB terminal becomes lower, the time it takes to charge the capacitor Cb1 decreases. In other words, the on time of the low side switching element Q1 decreases, and the direct current voltage Vo is thus turned into a constant voltage.

A diode D9 defines a discharge path for an electric charge from the capacitor Cb1. In other words, when the output voltage of the switching controlling IC 84 changes to the low level (when Q1 is turned off), the electric charge in the capacitor Cb1 is discharged through the diode D9.

In this manner, the circuit including the switching controlling IC 84, which is an IC that operates in a current mode, the constant current circuit CC1, and the capacitor Cb1 functions as a voltage-time conversion circuit. Then, a voltage of a feedback signal that is generated by detecting the direct current voltage Vo and by comparing the direct current voltage Vo with the reference voltage is converted through the aforementioned voltage-time conversion circuit, and the low side switching element Q1 is turned on for a duration equivalent to the obtained time.

A high side switching controlling unit (switching controlling circuit of the present invention) 61 is provided between the drive winding (hereinafter, referred to as a high side drive winding) nb2 of the transformer T and a high side switching element Q2. Specifically, a first end of the high side drive winding nb2 of the transformer T is connected to a node (source terminal of the high side switching element Q2) between the low side switching element Q1 and the high side switching element Q2, and the high side switching controlling unit 61 is connected between a second end of the high side drive winding nb2 and a gate terminal of the high side switching element Q2.

The high side switching controlling circuit 61 is a bidirectional constant current circuit that includes a diode bridge rectifying circuit that includes four diodes D1, D2, D3, and D4 and a constant current circuit CC2 that is connected between a node between the diodes D1 and D3 and a node between the diodes D2 and D4, or in other words, connected between output ports of the aforementioned diode bridge rectifying circuit.

A turn-on delaying circuit that delays turning on the high side switching element Q2 by a delay time td2, which will be described later, is provided in the high side switching controlling unit 61 by a resistor R5 and an input capacitance (capacitance between the gate and the source) of the high side switching element Q2. This turn-on delaying circuit turns on the high side switching element Q2 when the delay time td2 elapses after the polarity of the voltage generated in the high side drive winding nb2 is reversed.

As described with reference to FIG. 1, the high side drive winding nb2 is wound in proximity to the secondary winding ns, and thus coupling between the high side drive winding nb2 and the secondary winding ns is strong. The waveform of a voltage generated in the high side drive winding nb2 becomes similar to the waveform of a voltage generated in the secondary winding ns, or in other words, similar to the waveform of a voltage generated in the excitation inductance of the secondary winding ns. Thus, the high side switching controlling unit 61 turns on the high side switching element Q2 at a timing at which a voltage is generated in the secondary winding ns so as to carry out the ZVS operation.

After the high side switching element Q2 is turned on, the high side switching controlling unit 61 forcedly turns off the high side switching element Q2 when a duration equivalent to the on time of the low side switching element Q1 elapses. In this manner, the high side switching element Q2 is turned off at a timing determined by a time constant circuit, irrespective of a resonance condition.

Figure 9:
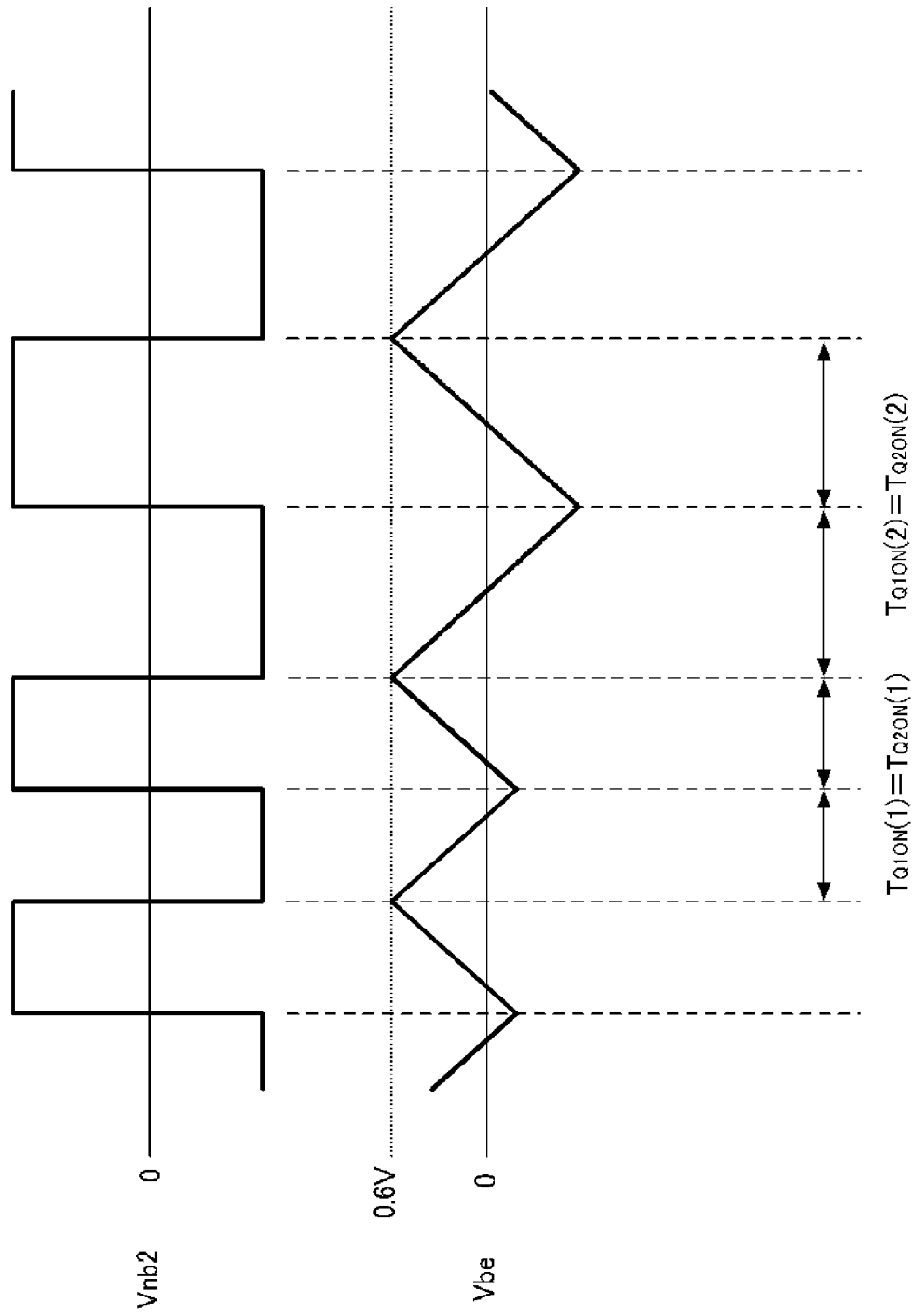
FIG. 9 is a waveform diagram illustrating a change in a voltage of the high side drive winding and a change in a voltage across a base and an emitter of a transistor arising when a load has changed.

FIG. 9 is a waveform diagram illustrating a change in a voltage Vnb2 of the high side drive winding nb2 and a change in a voltage Vbe across the base and the emitter of a transistor Q3 arising when a load changes.

A capacitor Cb2 is charged and discharged with constant currents of the same current value, and thus the gradients of the voltage Vbe across the base and the emitter of the transistor Q3 are equal or substantially equal. Thus, the on time of the high side switching element Q2 is equal or substantially equal to the on time of the low side switching element Q1. In FIG. 9, TQ1ON(1) is equal to TQ2ON(1) through the operation described above. Even when the on time of the low side switching element Q1 is extended so as to become TQ1ON(2), TQ1ON(2) is equal or substantially equal to TQ2ON(2) through the operation described above.

In this manner, as the on time of the low side switching element Q1 changes, the on time of the high side switching element Q2 changes accordingly.

As described thus far, in the switching power supply device 101, the low side switching element Q1 is turned on with a timing at which the polarity of a voltage generated in the low side drive winding nb1 is reversed serving as a trigger. In addition, the switching power supply device 101 operates as a current resonance type half bridge converter in which the low side switching element Q1 and the high side switching element Q2 are turned on/off in an alternating manner at a time ratio D=0.5 with a dead time, in which both the low side switching element Q1 and the high side switching element Q2 are off, provided in-between.

Figure 10:
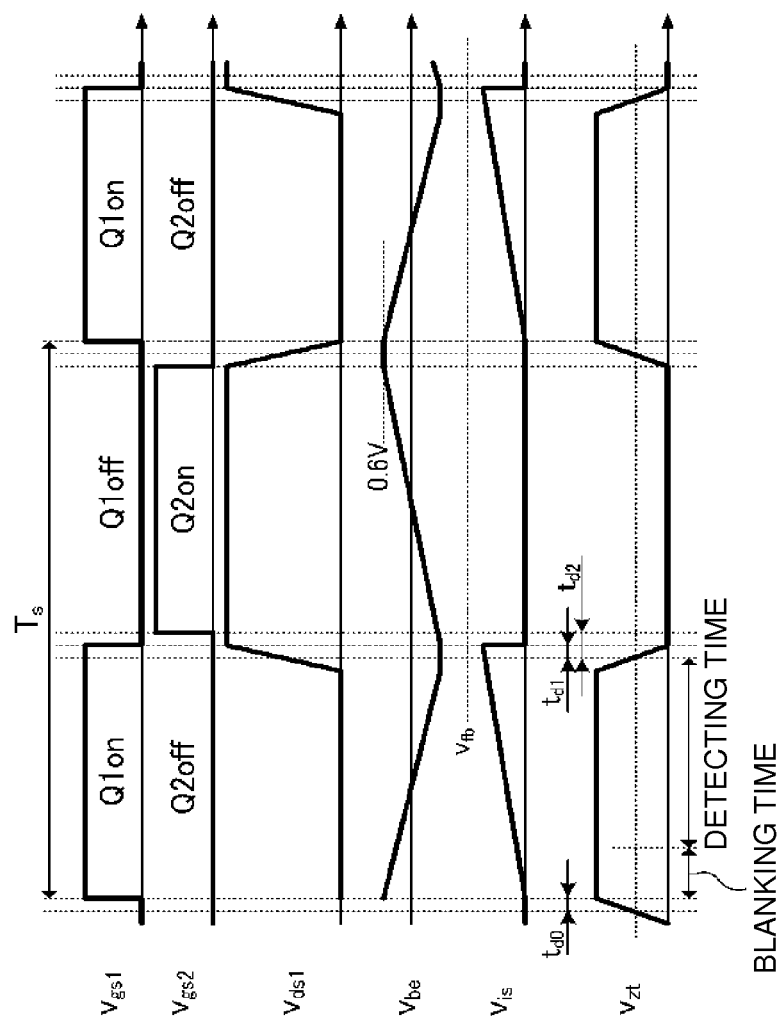
FIG. 10 is a waveform diagram illustrating a relationship among a voltage across a gate and a source of a low side switching element, a voltage across a gate and a source of a high side switching element, a voltage across a drain and the source of the low side switching element, a voltage across the base and the emitter of the transistor, a voltage Vis at an IS terminal of a switching controlling IC, and a voltage Vzt at a ZT terminal.

FIG. 10 is a waveform diagram illustrating a relationship among a voltage Vgs1 across the gate and the source of the low side switching element Q1, a voltage Vgs2 across the gate and the source of the high side switching element Q2, a voltage Vds1 across the drain and the source of the low side switching element Q1, a voltage (voltage of the capacitor Cb2) Vbe across the base and the emitter of the transistor Q3, a voltage (voltage of the capacitor Cb1) at the IS terminal of the switching controlling IC 84, and a voltage Vzt at the ZT terminal. With reference to FIG. 10, the operation of the switching power supply device 101 will be described. The operation of the switching power supply device 101 in a single cycle is as follows.

The switching controlling IC 84 detects that the polarity of a winding voltage generated in the low side drive winding nb1 of the transformer T has been reversed on the basis of an input voltage of the ZT terminal, and turns off the low side switching element Q1 at a timing that is delayed by the delay time td1 from the time at which the reversal of the polarity has been detected.

At the same time, the capacitor Cb2 is discharged through the constant current circuit CC2.

The low side switching element Q1 is turned off at a timing generated through a signal voltage that is based on a feedback signal (Feedback) to control the direct current voltage Vo.

As the low side switching element Q1 is turned off, the input capacitance (capacitance between the gate and the source) of the high side switching element Q2 is charged with a winding voltage generated in the high side drive winding nb2, and the high side switching element Q2 is then turned on. Thus, the high side switching element Q2 is turned on at a timing delayed by the delay time td2 caused by the charging.

At the same time, the capacitor Cb2 is charged through the constant current circuit CC2.

As the charging voltage Vbe of the capacitor Cb2 reaches a threshold voltage of the transistor Q3, the transistor Q3 is turned on, and the input capacitance of the high side switching element Q2 is rapidly discharged. Thus, the high side switching element Q2 is turned off.

Through this, the polarity of the winding voltage generated in the low side drive winding nb1 of the transformer T is reversed. The switching controlling IC 84 detects such reversal on the basis of the input voltage of the ZT terminal. The low side switching element Q1 is turned on when the delay time td0 elapses after the polarity of the voltage has been reversed.

Figure 11A:
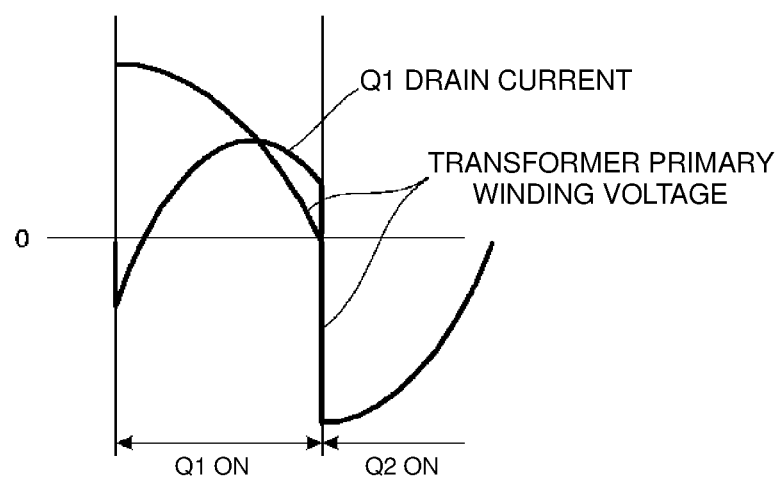
FIG. 11A illustrates a waveform diagram of a voltage at a primary winding of a transformer T and a drain current of the low side switching element in an off-resonance prevention state.
Figure 11B:
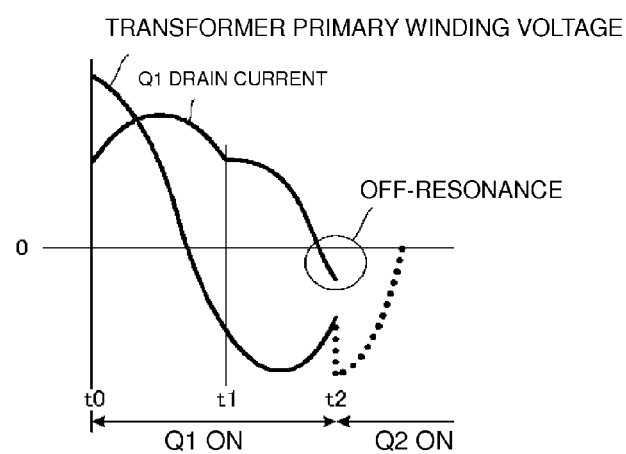
FIG. 11B illustrates a waveform diagram of a voltage at a primary winding np of the transformer T and a drain current of the low side switching element in a state in which "off-resonance" has occurred.

FIG. 11A illustrates a waveform diagram of a voltage at the primary winding np of the transformer T and a drain current of the low side switching element Q1 in a normal state without "off-resonance." In addition, FIG. 11B illustrates a waveform diagram of a voltage at the primary winding np of the transformer T and a drain current of the low side switching element Q1 in a state in which "off-resonance" has occurred. Here, a segment of the waveform of the drain current between t0 and t1 is a current waveform that is based on a series resonance of the resonant inductor (including the leakage inductance of the primary winding np) Lr having a relatively small inductance value and the resonant capacitor Cr, and a segment between t1 and t2 is a current waveform that is based on a series resonance of the resonant inductor Lr, the excitation inductance of the transformer T, and the resonant capacitor Cr.

When the switching frequency is represented by fs, and the resonant frequency of a first series circuit is represented by fm, the relationship of fm<fs holds true in a normal operation. Then, when a load is light, the switching frequency fs increases, and the output electric power decreases in turn. When the load is heavy, the switching frequency fs decreases, and the output electric power increases in turn. As long as such a magnitude relationship of the frequencies holds true, the current that flows in the primary winding np of the transformer T operates with a "current delayed phase" in which the phase is delayed relative to the voltage applied to the primary winding np.

However, the switching frequency fs decreases as the load becomes heavier, and fs<fm becomes true, which results in a state that deviates from the resonance condition ("off-resonance"). In other words, a relationship in which the switching frequency fs is lower than the resonant frequency fm corresponds to a state in which the transformer T is seen as a capacitive impedance from the primary side of the transformer T, and the phase of the current waveform is advanced relative to the phase of the waveform of the voltage applied to the primary winding np of the transformer T. In such a case, a period in which the low side switching element Q1 and the high side switching element Q2 are on at the same time (so-called arm short circuit state) is generated, and an excessively large current flows in the two switching elements Q1 and Q2, which causes a large loss.

Specifically, if the phase of the current waveform is being advanced relative to the phase of the voltage waveform, the high side switching element Q2 is turned on after the low side switching element Q1 is turned off with a dead time provided therebetween. However, if the high side switching element Q2 is turned on in a state in which the direction of the current flowing in the low side switching element Q1 has already been reversed (flowing in a body diode of the low side switching element Q1), electricity flows in the high side switching element Q2 in a state in which electricity is flowing in the body diode of the low side switching element Q1 due to a shut-off delay arising from the reverse recovery characteristics of the body diode, and the aforementioned arm short circuit occurs. In addition, the ZVS operation cannot be carried out in a state in which the phase of the current waveform is advanced relative to the phase of the voltage waveform, which leads to an increase in a switching loss.

As illustrated in FIG. 11B, in a state in which the switching frequency fs becomes lower than the resonant frequency fm and "off-resonance" occurs, the current phase is advanced as described above. Therefore, the high side switching element Q2 is turned on after the drain current of the low side switching element Q1 becomes negative (in a state in which a current is flowing in the body diode of the low side switching element Q1), and thus the aforementioned problem of an arm short circuit occurs.

According to a preferred embodiment of the present invention, as illustrated in FIG. 8 and FIG. 10, when the voltage at the ZT terminal falls close to 0 V in a state in which the voltage at the OUT terminal of the switching controlling IC 84 is high, the switching controlling IC 84 forcedly turns off the low side switching element Q1. This forced turn-off operation is carried out prior to the high side switching element Q2 being turned on. In other words, td1 and td2 are determined so as to satisfy such a condition that the delay time td1 starting from the timing of detecting the polarity of the winding voltage generated in the low side drive winding nb1 being reversed until the low side switching element Q1 is turned off is less than the delay time td2 until the input capacitance of the high side switching element Q2 is charged so as to turn on the high side switching element Q2 (td1<td2).

In this manner, as illustrated in FIG. 10, in an off-resonance prevention state, Q1 is turned off before the voltage Vis at the IS terminal reaches a feedback voltage Vfb applied to the FB terminal. Therefore, while the direct current voltage Vo to be outputted falls below a prescribed value, even in a state in which the voltage of the input power supply Vi falls below a predetermined voltage due to, for example, a power failure or the like, the converter continues to operate without an arm short circuit, and the supply of the output electric power is maintained. As a result, even if the supply of the voltage of the input power supply Vi is shut off, the converter is capable of being stopped safely without an arm short circuit. In addition, the output holding time of the direct current voltage Vo is capable of being extended even in a case of an instantaneous power failure or the like.

In this manner, a situation in which the switching frequency fs falls below the resonant frequency fm so as to deviate from the resonance condition does not occur, and in a transitional operation state such as starting, stopping, and an output short circuit, even if the winding voltage of the primary winding np is reversed after the low side switching element Q1 is turned on, the high side switching element Q2 is not turned on before Q1 is turned off on the basis of the feedback signal. In other words, an arm short circuit does not occur, and a situation in which a damage to the switching power supply device 101 increases a loss is reliably prevented.

The switching controlling IC 84 illustrated in FIG. 8 includes a circuit configured to set a blanking time. Specifically, a signal inputted to the ZT terminal is not detected for a predetermined period of time (set blanking time) after a pulse that drives the low side switching element Q1 is generated. In other words, the input of the ZT terminal is masked. In this manner, by setting a blanking time for which the polarity of the winding voltage is not detected for a predetermined period of time, in the blanking time, even if switching noise that may serve as a signal that turns on the low side switching element Q1 is inputted to the ZT terminal, such a malfunction that the low side switching element Q1 is turned on through a noise signal is prevented from occurring.

It is to be noted that providing a delaying circuit to generate the delay time td2 by the resistor R5 (impedance circuit) connected in series to a control terminal of the high side switching element Q2 and the input capacitance (capacitance between the gate and the source) present at the gate terminal of the high side switching element Q2 reduces the number of components, and the size of the switching power supply device is thus significantly reduced.

Preferred Embodiment 2

Figure 12:
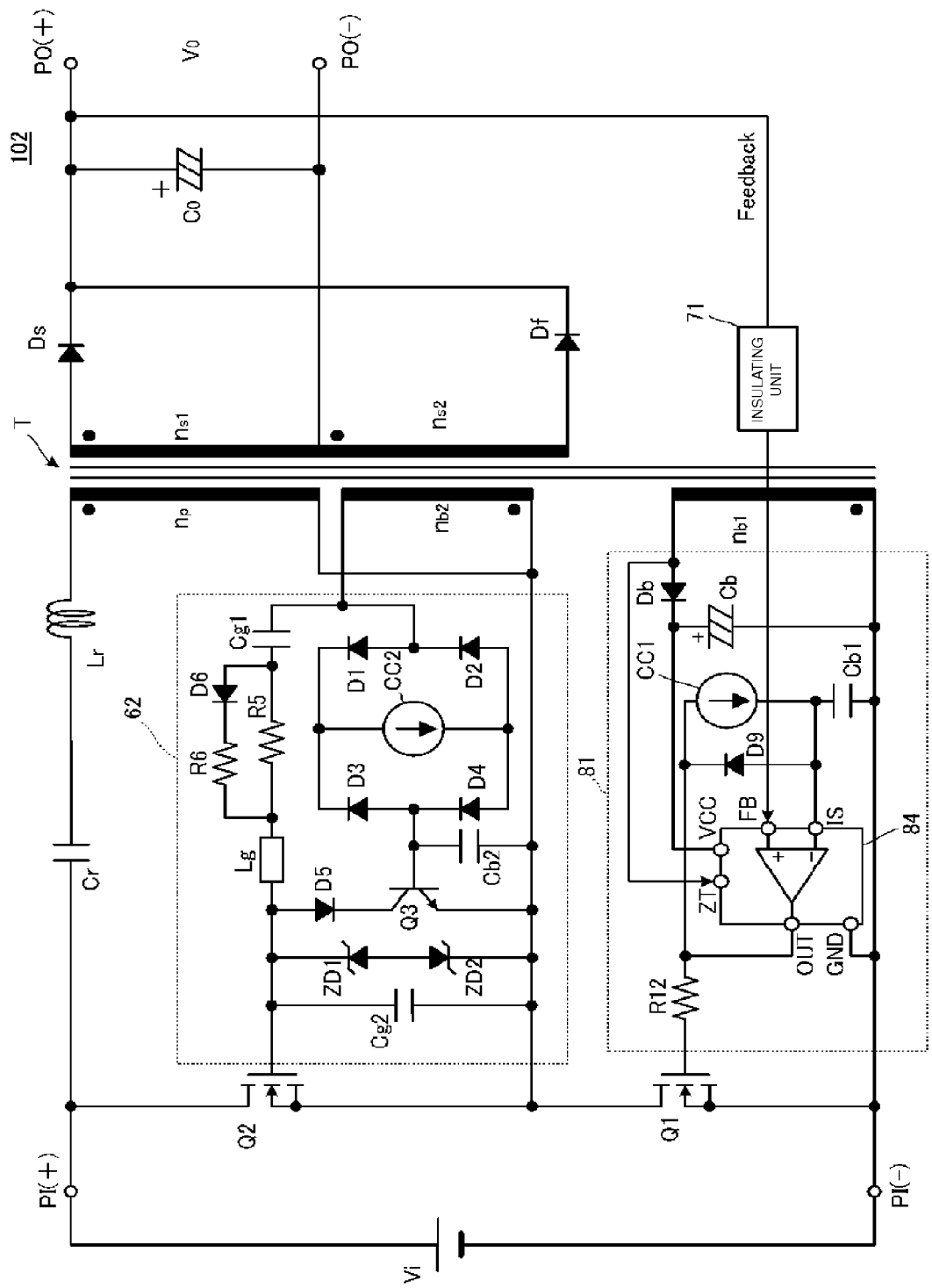
FIG. 12 is a circuit diagram of a switching power supply device according to Preferred Embodiment 2 of the present invention.

FIG. 12 is a circuit diagram of a switching power supply device according to Preferred Embodiment 2 of the present invention. This switching power supply device 102 is preferably the same as the switching power supply device 101 illustrated in FIG. 8 in a first preferred embodiment except for a high side switching controlling unit 62.

In the high side switching controlling unit 62, an impedance circuit that is provided by a capacitor Cg1, a diode D6, resistors R5 and R6, and an inductor Lg is connected between the output of the high side drive winding nb2 and the high side switching element Q2. The inductor Lg is, for example, a chip inductor, a bead inductor, or the like. In addition, a series circuit provided by Zener diodes ZD1 and ZD2 and a capacitor Cg2 are connected between the gate and the source of the high side switching element Q2. Other configurations of the high side switching controlling unit 62 are preferably the same as those of the high side switching controlling unit 61 illustrated in FIG. 8.

A turn-on delaying circuit for the high side switching element Q2 is provided by the aforementioned impedance circuit connected between the output of the high side drive winding nb2 and the control terminal of the high side switching element Q2 and the capacitor Cg2.

The capacitor Cg2 is charged with the winding voltage generated in the high side drive winding nb2, and Q2 is turned on when the voltage across the gate and the source of the high side switching element Q2 exceeds a threshold value.

A series circuit including the diode D6 and the resistor R6 is connected in parallel with the resistor R5. Therefore, the rise of the gate voltage of the high side switching element Q2 is set by the parallel impedance of R5 and R6, and the fall is set dominantly by the impedance of only R5.

The capacitor Cg1 controls the value of the voltage across the gate and the source of the high side switching element Q2 through a divided capacitance of the capacitor Cg1 and the capacitor Cg2. In addition, the Zener diodes ZD1 and ZD2 limit the maximum variation range of the value of the voltage across the gate and the source of the high side switching element Q2.

According to this preferred embodiment, the impedance of the impedance circuit partially constituting the turn-on delaying circuit for Q2 changes in accordance with the direction of the current, and thus the turn-on speed and the turn-off speed of the switching element Q2 are adjusted independently from each other.

In addition, the aforementioned impedance circuit is provided by a series circuit that includes the capacitor Cg1 and the resistors R5 and R6. Therefore, a dividing ratio with the input capacitance present at the gate terminal of the high side switching element Q2 is adjusted by adjusting the capacitance value of the capacitor Cg1, and a gate voltage that is appropriate to turn on and turn off the high side switching element Q2 is applied.

In addition, since the inductor Lg is provided in the aforementioned impedance circuit, a high frequency surge current is significantly reduced or prevented, and an excessively high voltage is prevented from being applied to the gate terminal of the high side switching element Q2.

Furthermore, since the Zener diodes are connected in parallel bidirectionally between the gate and the source of the high side switching element Q2, an excessively high voltage is prevented from being applied to the gate terminal of the high side switching element Q2. It is to be noted that the Zener diodes connected in parallel between the gate and the source of the high side switching element Q2 may be connected only unidirectionally.

Preferred Embodiment 3

Figure 13:
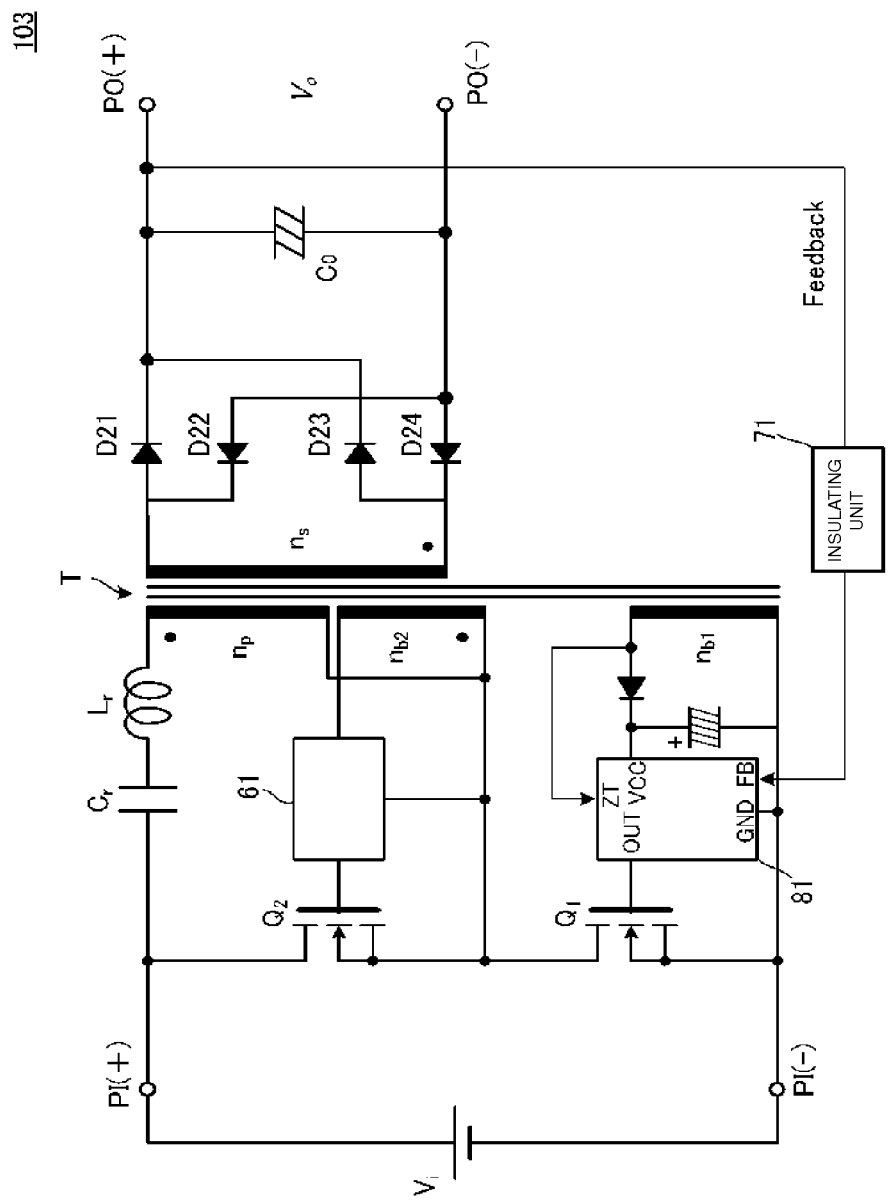
FIG. 13 is a circuit diagram of a switching power supply device according to Preferred Embodiment 3 of the present invention.

FIG. 13 is a circuit diagram of a switching power supply device according to Preferred Embodiment 3 of the present invention. This switching power supply device differs from the switching power supply device of Preferred Embodiment 1 illustrated in FIG. 8 in terms of the configuration of the transformer T at the secondary side.

In Preferred Embodiment 3, a diode bridge circuit formed by diodes D21, D22, D23, and D24 and the capacitor Co are connected to the secondary winding ns of the transformer T. In this manner, the full waves are rectified by the diode bridge circuit.

Preferred Embodiment 4

Figure 14:
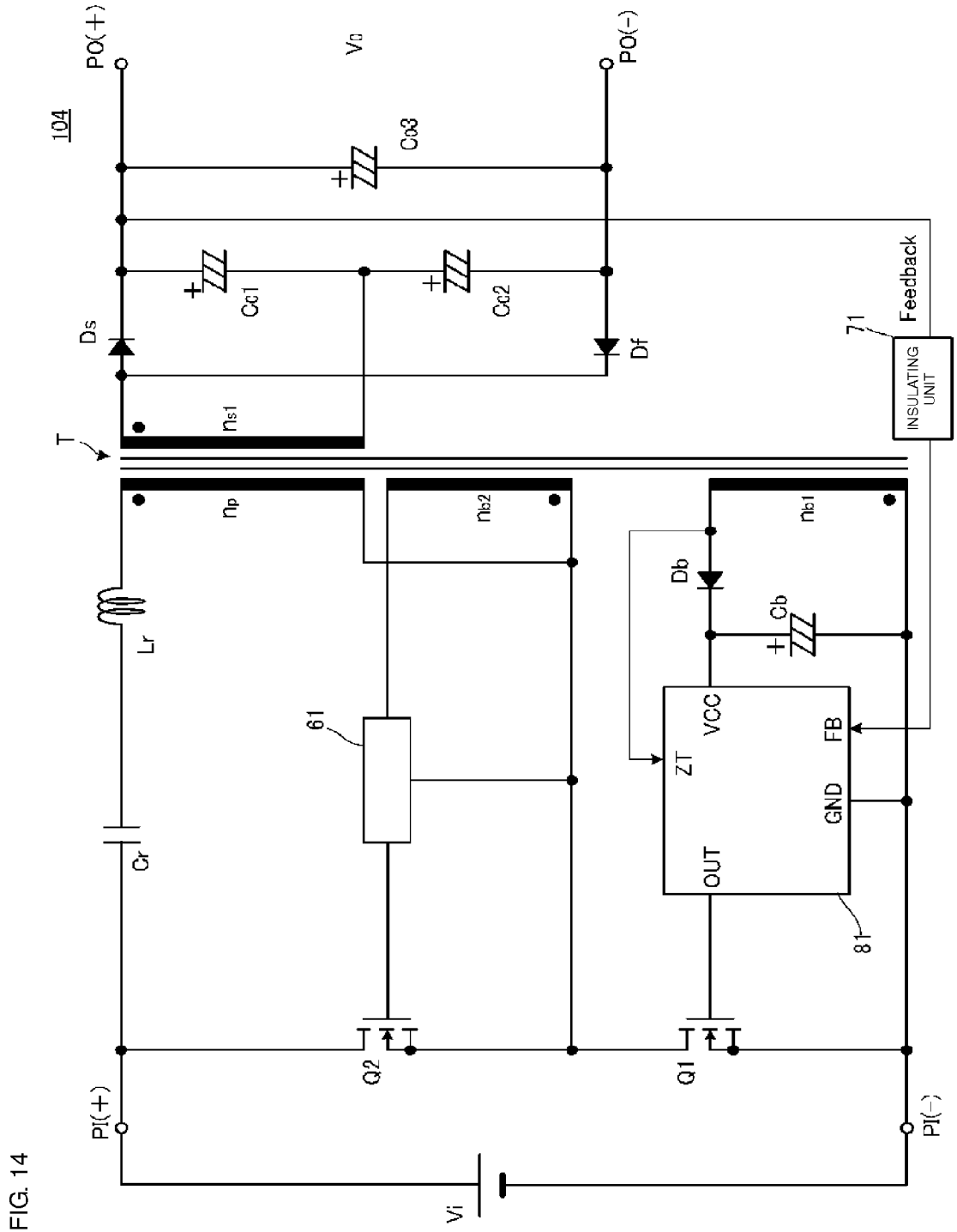
FIG. 14 is a circuit diagram of a switching power supply device according to Preferred Embodiment 4 of the present invention.

FIG. 14 is a circuit diagram of a switching power supply device according to preferred Embodiment 4 of the present invention. A switching power supply device 104 according to Preferred Embodiment 4 differs from the switching power supply device of Preferred Embodiment 1 illustrated in FIG. 8 in terms of the configuration of the transformer T at the secondary side.

In preferred Embodiment 4, a rectifying smoothing circuit including the diode Ds and a capacitor Co1 is provided between the two ends of the secondary winding ns1 of the transformer T, and a capacitor Co3 is connected between the output terminals PO(+) and PO(−). In addition, a midpoint of a series circuit including the diode Df and a capacitor Co2 is connected to the output terminal PO(−), and the two ends of the series circuit are connected to the respective ends of the secondary winding ns1 of the transformer T. In this manner, a voltage doubling rectifying circuit is provided.

Preferred Embodiment 5

Figure 15:
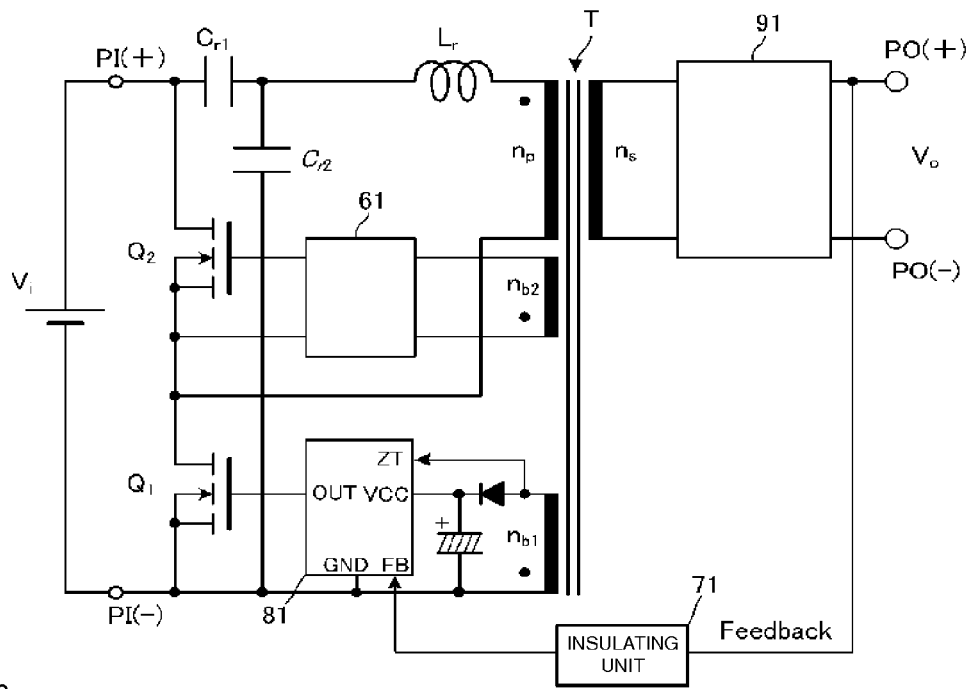
FIG. 15 is a circuit diagram of a switching power supply device according to Preferred Embodiment 5 of the present invention.

FIG. 15 is a circuit diagram of a switching power supply device according to Preferred Embodiment 5 of the present invention. A switching power supply device 105 according to Preferred Embodiment 5 differs from the switching power supply devices of the above-described preferred embodiments in that not only is a series circuit provided by a resonant capacitor Cr1 and the resonant inductor Lr provided between the drain of the high side switching element Q2 and one end of the primary winding np of the transformer T but also a resonant capacitor Cr2 is provided between a node between the resonant capacitor Cr1 and the resonant inductor Lr and a ground line.

The resonant capacitor Cr1 is configured such that the resonant inductor Lr, the primary winding np, the high side switching element Q2, and the resonant capacitor Cr1 define a closed loop. In addition, the resonant capacitor Cr2 is configured such that the resonant inductor Lr, the primary winding np, the low side switching element Q1, and the resonant capacitor Cr2 define a closed loop.

In this manner, by connecting the resonant capacitor Cr2, the current supplied from the input power supply Vi flows through the resonant capacitors Cr1 and Cr2 during both the on time of the low side switching element Q1 and the on time of the high side switching element Q2. As compared to a circuit configuration in which the current supplied from the input power supply Vi flows only during the on time of the low side switching element Q1, the effective current of the current supplied from the input power supply Vi is reduced. Through this, a conduction loss caused by the current supplied from the input power supply Vi is significantly reduced.

Preferred Embodiment 6

Figure 16:
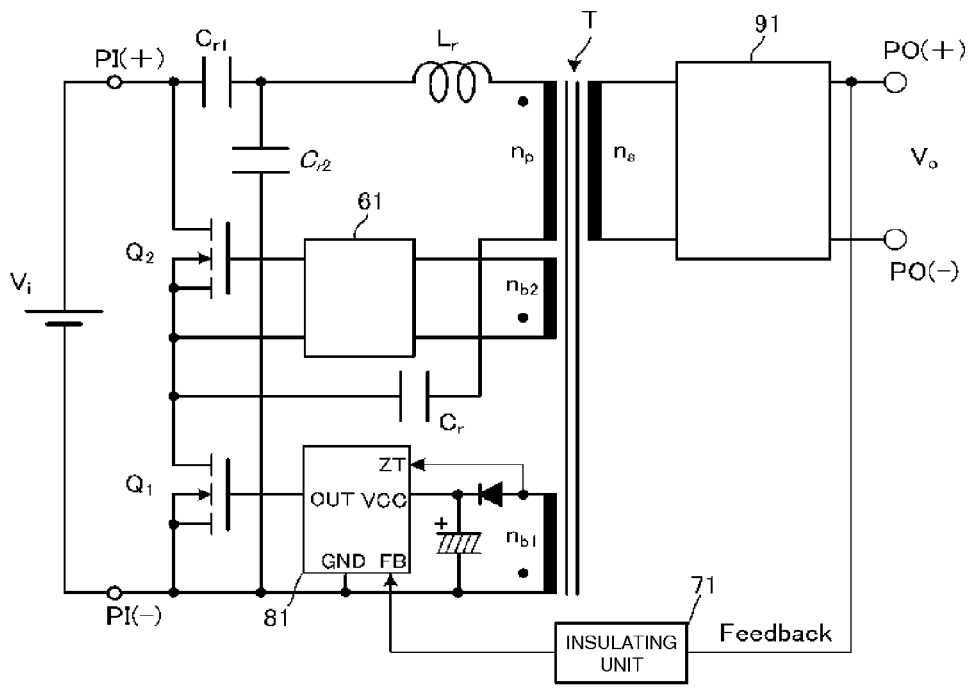
FIG. 16 is a circuit diagram of a switching power supply device according to Preferred Embodiment 6 of the present invention.

FIG. 16 is a circuit diagram of a switching power supply device according to Preferred Embodiment 6 of the present invention. A switching power supply device 106 according to Preferred Embodiment 6 differs from the switching power supply device of Preferred Embodiment 1 illustrated in FIG. 8 in that the resonant capacitors Cr1 and Cr2 are provided in addition to the resonant capacitor Cr.

The resonant capacitors Cr1 and Cr2 are configured such that the resonant inductor Lr, the primary winding np, the resonant capacitor Cr, the high side switching element Q2, and the resonant capacitor Cr1 define a closed loop and such that the resonant inductor Lr, the primary winding np, the resonant capacitor Cr, the low side switching element Q1, and the resonant capacitor Cr2 define a closed loop.

In addition, the resonant capacitors Cr1 and Cr2 are connected so as to divide the voltage of the input power supply Vi. In this manner, there may be a plurality of resonant capacitors (Cr, Cr1, Cr2) through which a resonant current flows.

A rectifying smoothing circuit 91 is connected to the secondary winding ns of the transformer T. This rectifying smoothing circuit 91 is the rectifying smoothing circuit that is defined by the diodes Ds and Df and the capacitor Co as illustrated in FIG. 8.

Although a rectifying circuit including a diode is preferably provided in a secondary side circuit of the transformer T in each of the preferred embodiments described above, in place of this diode, a rectifying FET may be provided so as to rectify synchronously. Through this, a loss in the secondary side circuit is significantly reduced.

In addition, various preferred embodiments of the present invention are configured to be applied to a switching power supply device in which two switching elements are complementarily turned on/off in an alternating manner, not only in a half bridge converter but also in a multi-transistor type converter, such as a full bridge converter, a voltage clamp converter, or the like.

In addition, transformers according to various preferred embodiments of the present invention secure the distance in accordance with the safety standard without weakening the magnetic field coupling between the primary winding np and the secondary winding ns. This effect does not change even in a case in which the transformer does not include the drive windings nb1 and nb2. In this case, the height of the primary winding np may be the same or substantially the same as the height of the secondary winding ns.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply device, comprising:
a power supply voltage inputting unit configured to accept input of an input power supply voltage;
a direct current voltage outputting unit configured to output a direct current voltage;
a transformer including a primary winding and a secondary winding that are wound around a winding portion of a bobbin, a low side drive winding, a high side drive winding, and a core defining a closed magnetic circuit;
a capacitor that defines an LC resonant circuit including the primary winding;
a series circuit that is connected to the power supply voltage inputting unit and that includes a low side switching element and a high side switching element; and
a switching controlling circuit that includes a low side switching controlling unit configured or programmed to control the low side switching element and a high side switching controlling unit configured or programmed to control the high side switching element; wherein
the LC resonant circuit includes a leakage inductance of the primary winding or the secondary winding of the transformer;
the low side switching element is connected to the primary winding in series and is configured to apply a voltage of the power supply voltage inputting unit to the primary winding upon being turned on;
the low side switching controlling unit is configured or programmed to turn on the low side switching element upon detecting a reversal of a polarity of a winding voltage generated in the low side drive winding and turn off the low side switching element at a timing that is based on a feedback signal of a circuit that detects an output voltage;
the high side switching controlling unit is configured or programmed to turn on the high side switching element upon detecting a reversal of a polarity of a winding voltage generated in the high side drive winding and turn off the high side switching element in accordance with an on time of the low side switching element;
the bobbin includes a partition portion that includes a slit;
the partition portion is provided along an outer periphery of the winding portion and divides the winding portion into a first winding area in which the primary winding is wound and a second winding area in which the secondary winding is wound;
the primary winding is wound to a first height h1 from the outer periphery of the winding portion;
the secondary winding is wound to a second height h2 from the outer periphery of the winding portion; and
the low side drive winding and the high side drive winding are wound on the primary winding so as to be next to each other in a winding axis direction with the high side drive winding located toward the secondary winding.

2. The switching power supply device according to claim 1, further comprising a cover that includes a protruding portion configured to be fitted into the slit and that covers the primary winding, the secondary winding, the low side drive winding, and the high side drive winding.

3. The switching power supply device according to claim 1, wherein a height of the partition portion at a side that opposes a board on which the transformer is mounted is greater than the second height h2.

4. The switching power supply device according to claim 2, wherein the partition portion is provided at a position that is offset from a middle of the winding portion along the winding axis.

5. The switching power supply device according to claim 1, wherein the secondary winding has a center tap removed therefrom and includes a first winding and a second winding that are wound as a bifilar winding.

6. The switching power supply device according to claim 1, wherein a cross-section of the core along a direction perpendicular or substantially perpendicular to the winding axis has a flat shape that is shortest in a direction that corresponds to the height dimension when the transformer is mounted.

7. The switching power supply device according to claim 1, wherein the capacitor is connected between the high side switching element and the low side switching element.

8. The switching power supply device according to claim 1, wherein the core is an E-type core.

9. The switching power supply device according to claim 1, wherein the bobbin includes a cylindrical portion, end plates are provided on a peripheral surface of the cylindrical portion at two ends thereof, and partition plates are provided on the peripheral surface of the cylindrical portion spaced from the end plates.

10. The switching power supply device according to claim 9, wherein a height of the end plates and the partition plates at a lower side of the transformer is greater than the height of the end plates and the partition plates at an upper side of the transformer.

11. The switching power supply device according to claim 10, wherein the height of the end plates and the partition plates at the upper side of the transformer is equal or substantially equal to a height of the secondary winding.

12. The switching power supply device according to claim 9, wherein the partition plates and the slit are provided between the primary winding and the secondary winding.

13. The switching power supply device according to claim 9, wherein the core includes a first core and a second core separated by a gap at a middle or approximate middle of the cylindrical portion.

14. The switching power supply device according to claim 1, wherein outermost peripheries of the high side drive winding and the low side drive winding are level with an outermost periphery of the secondary winding.

15. The switching power supply device according to claim 1, wherein a cross-sectional area of one of the high side drive winding and the low side drive winding is the same or substantially the same as a cross-sectional area of the secondary winding.

16. The switching power supply device according to claim 2, wherein the cover includes a protruding portion that fits into the slit.

17. The switching power supply device according to claim 1, wherein the high side switching controlling unit includes a bidirectional constant current circuit that includes a diode bridge rectifying circuit that includes diodes and a constant current circuit.

18. The switching power supply device according to claim 1, wherein the high side switching controlling unit includes an impedance circuit including a capacitor, a diode, resistors, and an inductor.

19. The switching power supply device according to claim 1, further comprising a diode bridge circuit including diodes and the capacitor connected to the secondary winding.

20. The switching power supply device according to claim 1, further comprising a rectifying smoothing circuit including a diode and a capacitor provided between two ends of the secondary winding.

* * * * *